C. N. COLPITTS.
CLOTH CUTTING AND FOLDING MACHINE.
APPLICATION FILED JAN. 24, 1908.
931,996.
Patented Aug. 24, 1909.
6 SHEETS—SHEET 5.
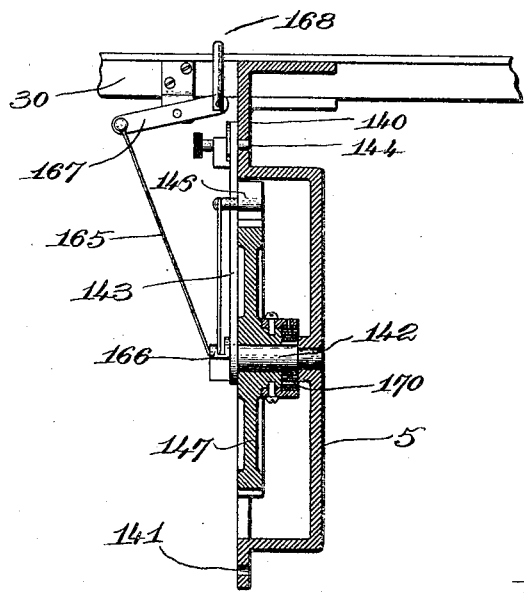
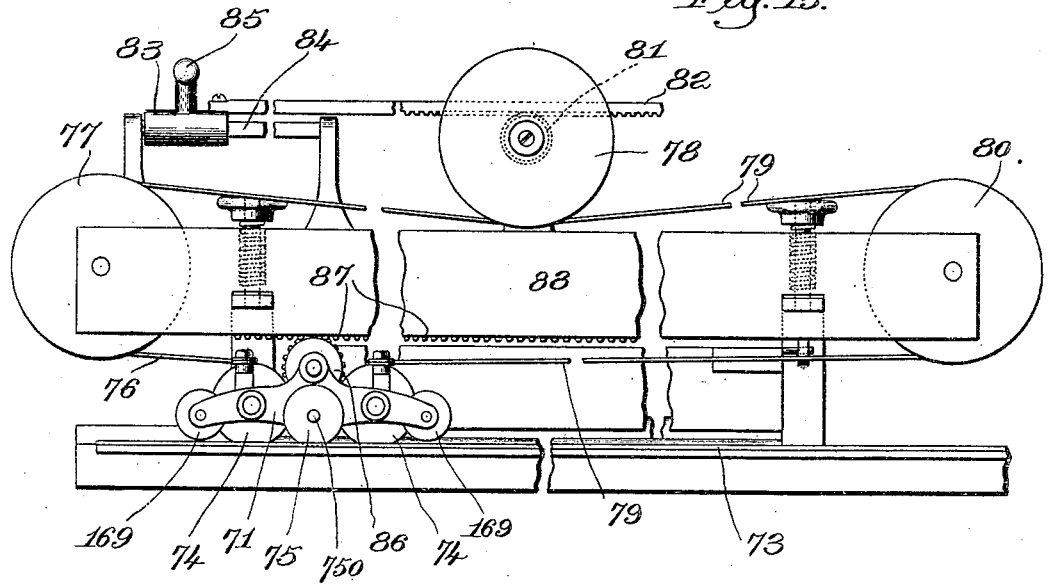
Witnesses.
Thomas J. Drummond
Joseph M. Ward,
Inventor.
Calvin N. Colpitts.
By Dusby Gregory
Attys.

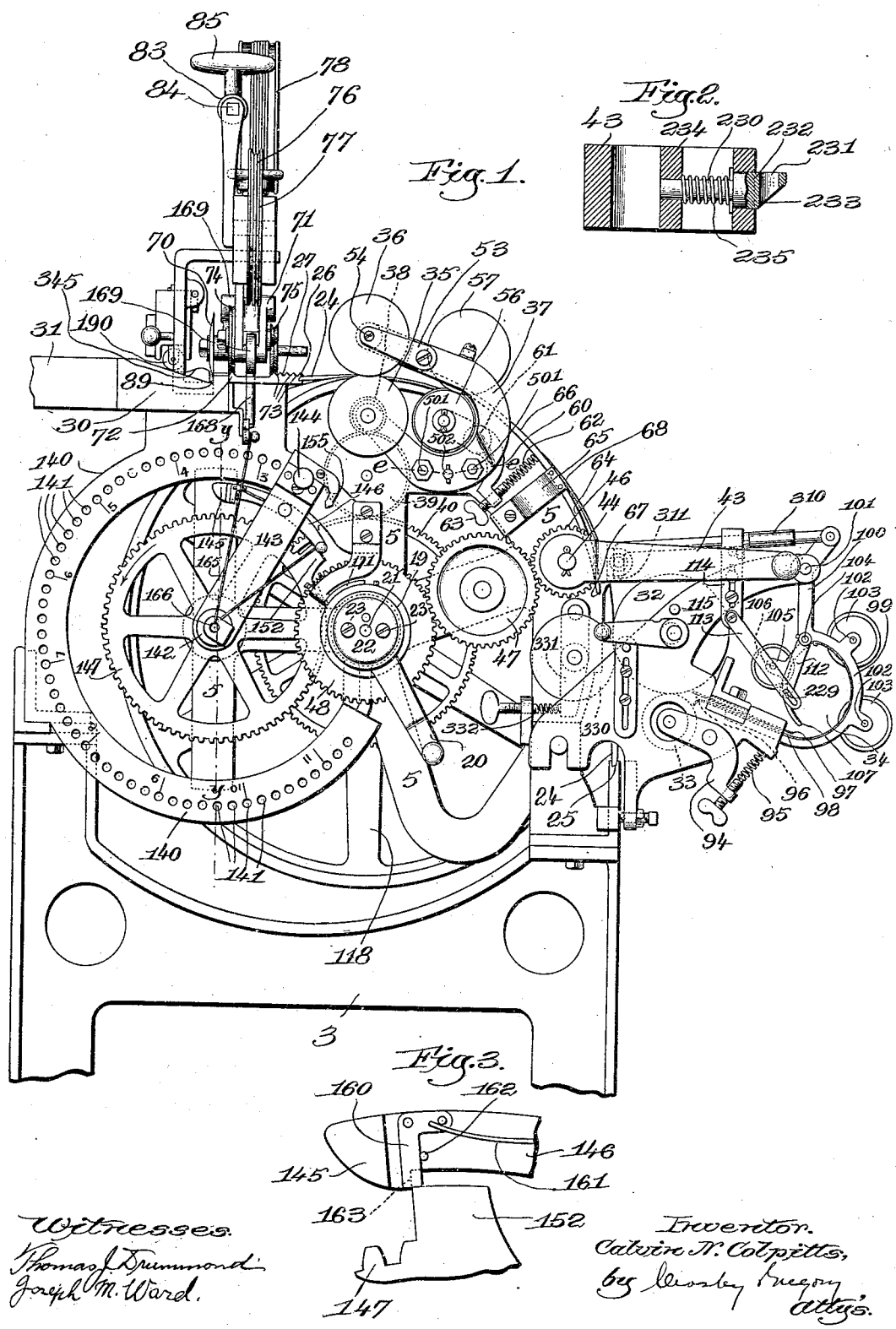

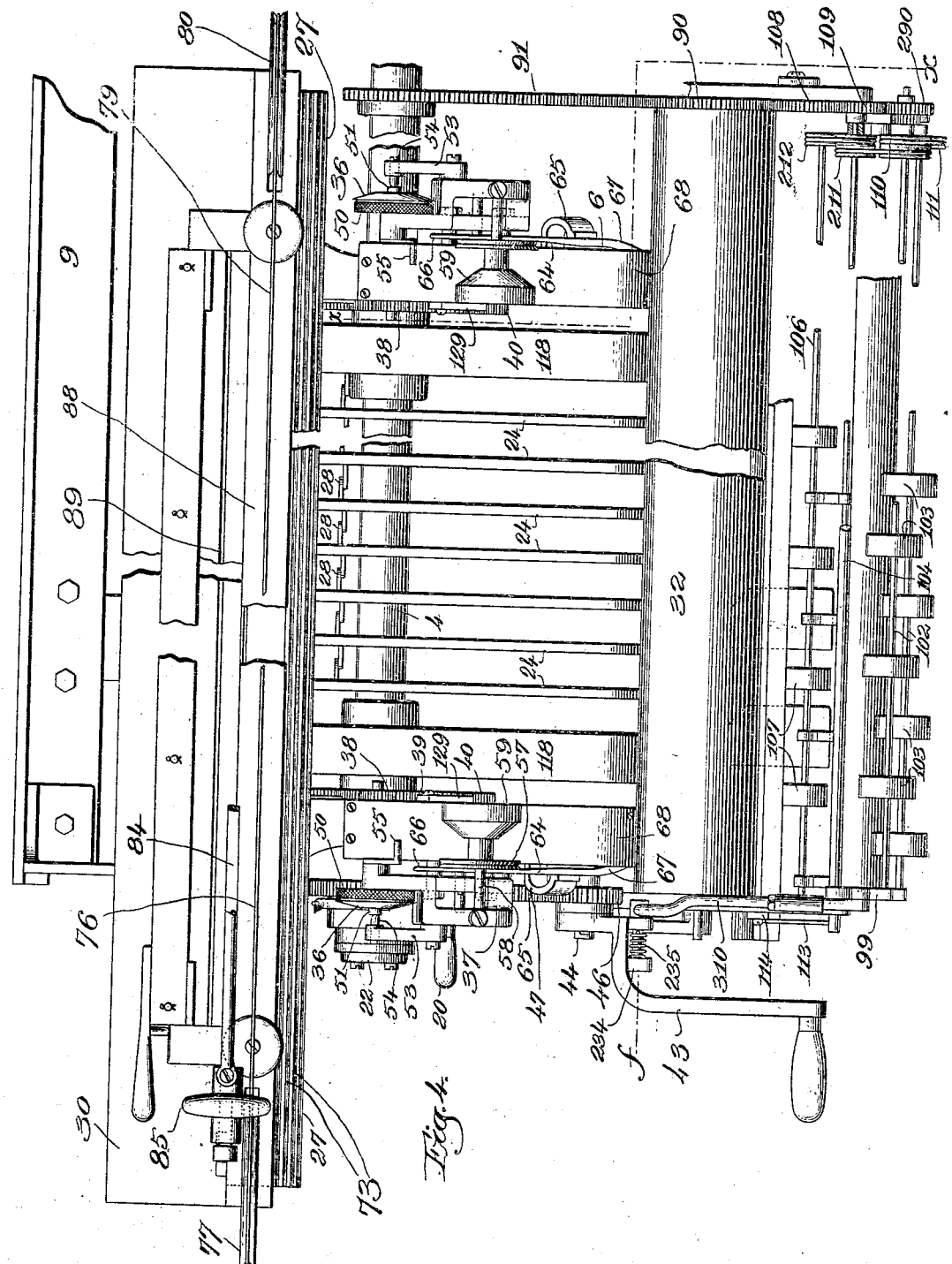

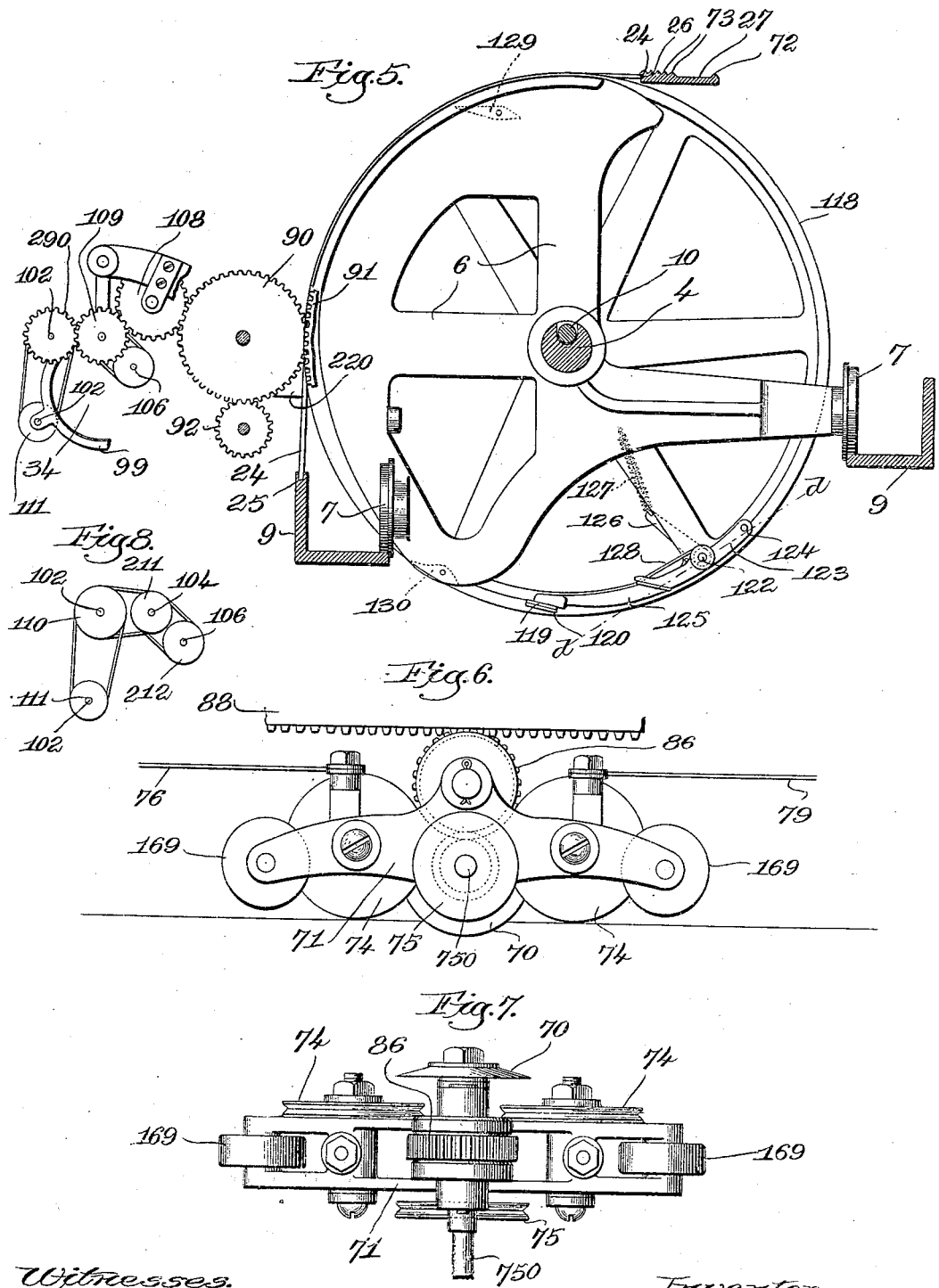

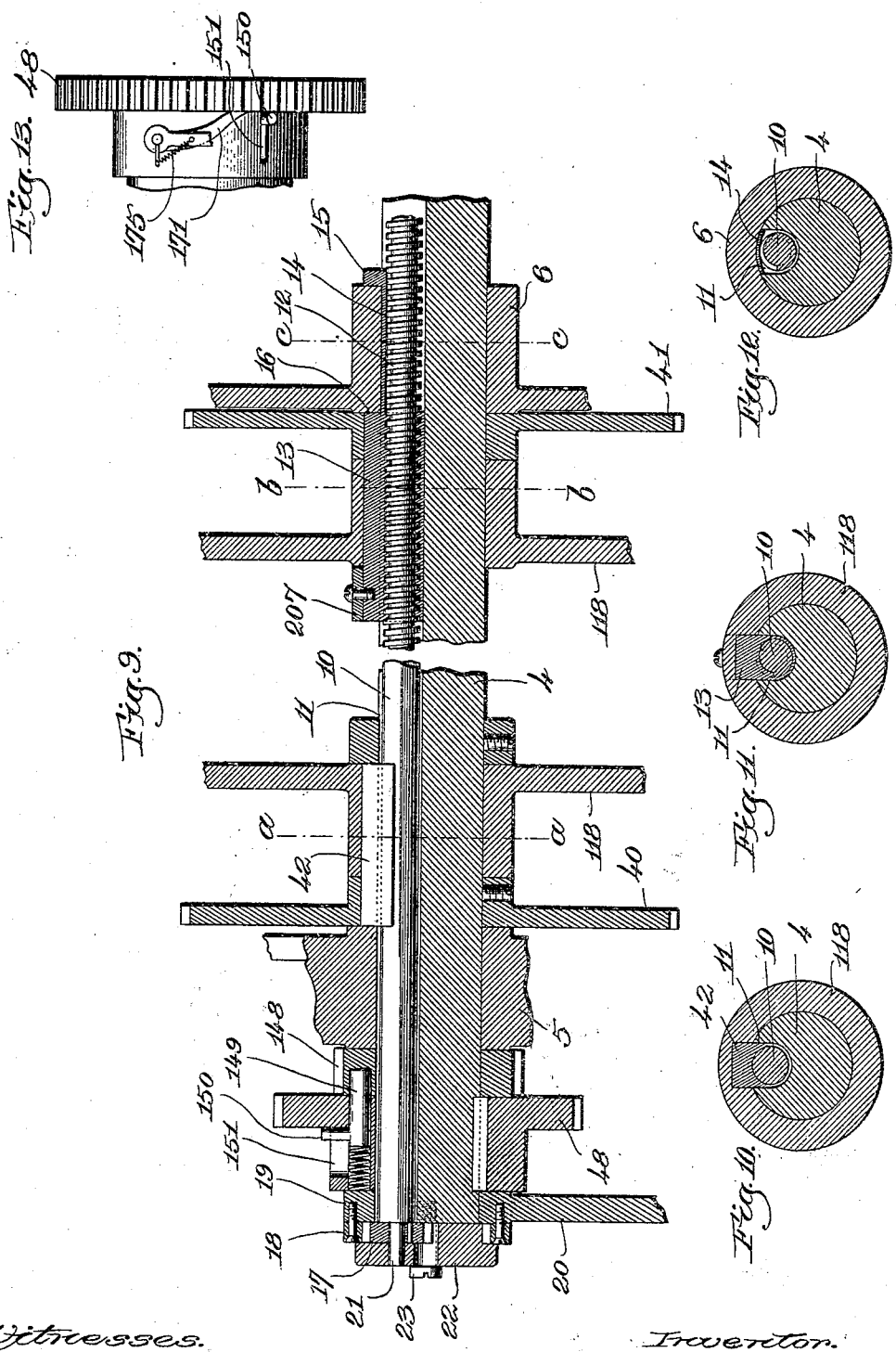

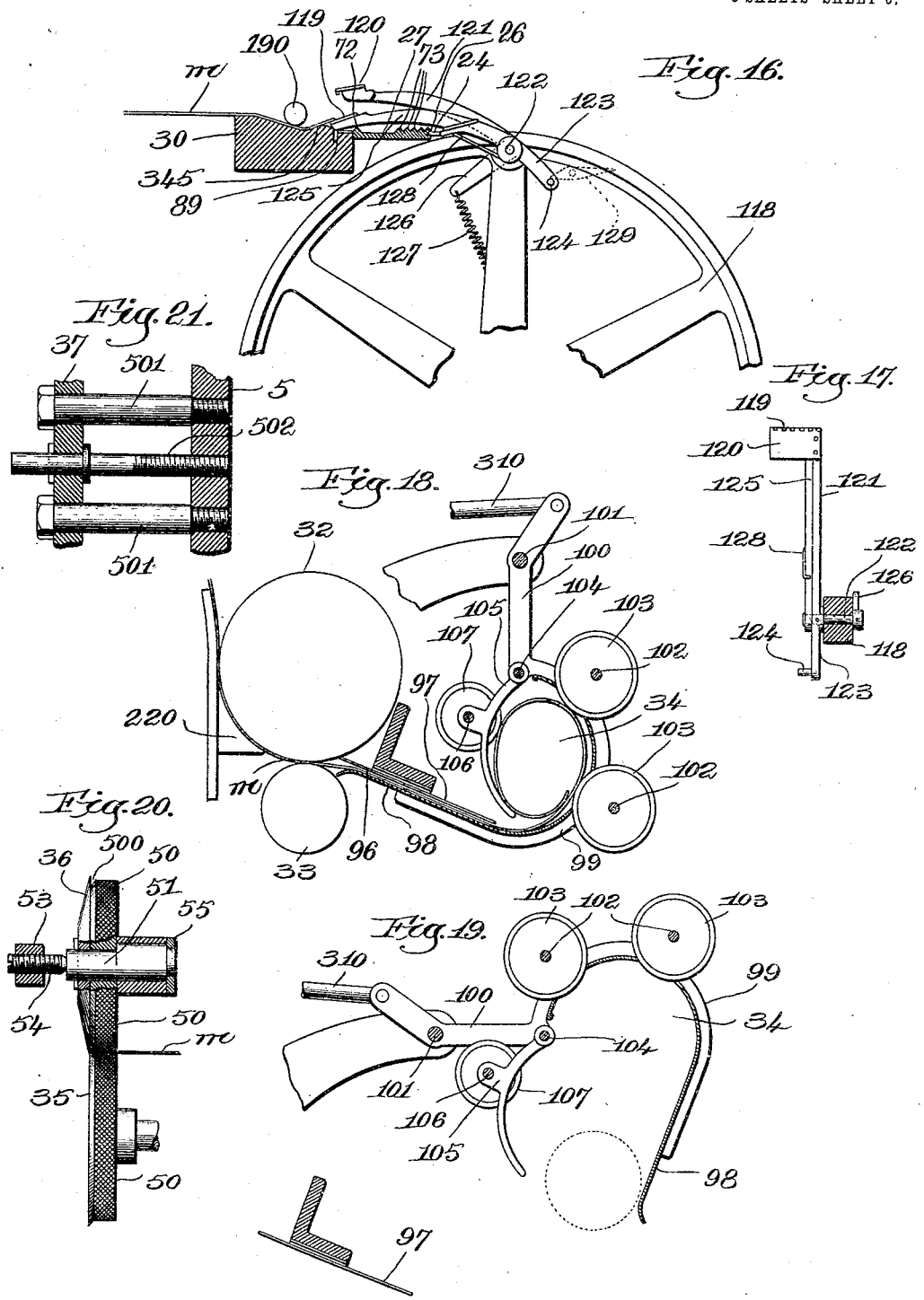

UNITED STATES PATENT OFFICE.

CALVIN N. COLPITTS, OF BOSTON, MASSACHUSETTS, ASSIGNOR TO AMERICAN SHADE MACHINE COMPANY, OF BOSTON, MASSACHUSETTS, A CORPORATION OF MAINE.

CLOTH CUTTING AND FOLDING MACHINE.

931,996.  Specification of Letters Patent.  Patented Aug. 24, 1909.

Application filed January 24, 1908. Serial No. 412,396.

*To all whom it may concern:*

Be it known that I, CALVIN N. COLPITTS, a citizen of the United States, and a resident of Boston, in the county of Suffolk and State of Massachusetts, have invented an Improvement in Cloth Cutting and Folding Machines, of which the following description, in connection with the accompanying drawing, is a specification, like numerals on the drawing representing like parts.

This invention relates to machines for cutting and folding cloth, and the embodiment of the invention herein illustrated has been especially designed for trimming to proper width material for window shades; cutting the trimmed shade material into any desired lengths; and rolling up the severed lengths. The machine herein illustrated is also provided with means for folding the edges of the trimmed material to form hems, and other means for providing folding creases across the end of the material at the point where the shade is to be folded at the bottom.

I will first describe one embodiment of my invention, and then point out the novel features thereof in the appended claims.

In the drawings, Figure 1 is a side view of a machine embodying my invention; Fig. 2 is a section on the line *f*, Fig. 4; Fig. 3 is a detail of the stop pawl for the feeding means; Fig. 4 is a top plan view of the machine shown in Fig. 1; Fig. 5 is a section on the line *x—x*, Fig. 4, looking to the right; Fig. 6 is a side view of the carriage on which is mounted the cutter for cutting the shade material into lengths; Fig. 7 is a plan view thereof; Fig. 8 is a detail of the driving means for the rolls of the receiving pocket; Fig. 9 is a vertical sectional detail view through the main shaft from which the parts are operated; Fig. 10 is a section on the line *a—a*, Fig. 9; Fig. 11 is a section on the line *b—b*, Fig. 9; Fig. 12 is a section on the line *c—c*, Fig. 9; Fig. 13 is a detail of the means for releasing the stop gear from the main shaft; Fig. 14 is a section on the line *y—y*, Fig. 1; Fig. 15 is a view illustrating the manner of operating the cutter for cutting the shade material into determined lengths; Fig. 16 is a detail showing the operation of the grippers; Fig. 17 is a section on the line *d—d*, Fig. 5; Fig. 18 is a detail of the receiving pocket for receiving the trimmed material, said figure showing the pocket closed; Fig. 19 is a similar view showing the pocket open; Fig. 20 is a detail view of the edge trimmer; Fig. 21 is a section on the line *e—e*, Fig. 1.

The operative parts of the machine are sustained on stands 3, and are driven by a main shaft 4 which is sustained at its ends in heads 5 and 6. The head 5 is stationary, while the head 6, shown in Fig. 5, is arranged to be moved toward or from the stationary head 5. The heads 5 and 6 carry the edge-trimming and edge-folding mechanism, and the object in making the head 6 adjustable is so that said head may be adjusted properly relative to the head 5 for cutting shade material to any width. The movable head 6 carries two rollers 7 which are sustained on bars 9 that extend transversely of the frame. For adjusting the head 6, I have provided an adjusting screw 10 (see Fig. 9) which extends longitudinally of the shaft 4 and occupies a longitudinal slot 11 formed therein. This adjusting screw 10 has a screw-threaded portion 12 which extends through and has screw-threaded engagement with a nut 13 that also occupies a portion of the groove 11. This nut 13 is reduced at one end to form the shoulder 16 and the neck portion 14, see Figs. 9 and 12, which neck portion extends longitudinally of the screw 10 and through the hub of the head 6, said neck portion having the enlarged end 15 at its end, which overlies the hub of said head 6. Said head 6 is thus confined between the shoulder 16 and the enlarged end 15 of the nut 13. Said nut 13 is held from rotation by its non-circular shape, see Fig. 11, which fits the non-circular shape of the groove 11, and therefore the turning of the screw 10 will move the nut longitudinally of the shaft without turning the nut relative to the shaft, and since the head 6 and the nut are compelled to move in unison, the rotation of the screw will shift the head 6 transversely of the frame. As shown in Fig. 12, the neck portion 14 of the nut is of such shape as to permit the shaft to rotate freely in the head 6, and this construction, therefore, permits the free rotation of the shaft but provides for shifting the head 6 transversely of the frame.

The screw 10 may be turned in any suitable or usual way, and as one convenient way I have shown the end of the screw 10 as having a pinion 17 thereon, see Fig. 9, which meshes with an internal gear 18 carried by a hub 19 that is loosely mounted on the shaft 4, said hub having a handle 20 extending therefrom by which it may be turned. The end of the screw 10 is shown as reduced in size at 21, and such reduced portion is journaled in a cap 22 which is held to the end of the shaft 4 by means of suitable screws 23 which are screw-threaded into the shaft 4. This cap not only provides a bearing for the end of the screw 10 but also operates to hold the hub 19 with the internal gear 18 thereon in place on the shaft 4.

Situated between the two heads 5 and 6 are a plurality of supports 24 which are curved in the arc of a circle. The lower ends of these supports are slidably sustained in a groove 25 formed in the cross piece or bar 9, see Fig. 5, while the upper ends thereof are received in a groove 26 formed in a plate 27 that extends transversely across the machine. These supporting members 24 are for the purpose of supporting and sustaining the shade material as it is drawn past or through the edge-trimming and folding devices, as will be presently described. They are all flexibly connected together by means of links 28 and the ones adjacent the heads 5 and 6 are flexibly connected thereto by similar links. The result of this construction is that as the head 6 is moved transversely of the machine, see Fig. 4, the supporting members 24 are moved in the grooves 25, 26 and automatically distribute themselves in the space between the heads.

The frame supporting the machine is constructed with the transversely-extending member 30, which is adapted to be placed against the edge of a table 31 from which the shade material is drawn, and during the operation of cutting and trimming the shade material, said material is drawn from the table 31 over the member 30, over the plate 27, and down over the supporting members 24 to a positively-driven feed roller 32 from which the shade material is fed into the receiving pocket 34.

The shaft 4 has mounted thereon two feeding wheels 118, one situated adjacent each head 5 and 6. The feeding wheel adjacent the head 5 is fast on the shaft, being keyed thereto by a key 42, see Fig. 9, while the other feeding wheel is arranged to be rotated by the shaft but is capable of being adjusted longitudinally thereof with the head 6. For this purpose said latter feeding wheel is splined on the nut 13, and confined thereon by the retaining block 207 so that as said nut is adjusted longitudinally of the shaft, said feeding wheel is carried therewith. These feeding wheels coöperate with the feeding roll 32 to feed the material over the supports 24 and into the pocket 34. The feed roll 32 is driven from the shaft 4 by means of a gear 91 thereon which meshes with and drives a gear 90 rigid with said roll, see Figs. 4 and 5.

33 and 330 (see Fig. 1) are presser rolls which co-act with the feed roll 32. The roll 330 is mounted in a pivoted arm 331 which is backed by a spring 332. The roll 33 extends the length of the machine and is sustained at its ends in pivoted arms 94 that are backed by springs 95, see Fig. 1, whereby the presser roll 33 is yieldingly held against the feed roll 32.

While the shade material is being drawn over the supporting members 24 by the feed roll, it is acted upon by the edge-trimming mechanism and folding mechanism, which will now be described.

There is an edge-trimming mechanism mounted on each of the heads 5 and 6, and each mechanism comprises a positively-driven rotary disk-cutter 35 and a coöperating rotary cutter 36. The cutters 35 are carried by brackets 37 sustained by the heads 5 and 6, and said cutters have rigid therewith pinions 38 which mesh with idler pinions 39 carried by said heads, and the idler pinions mesh with and are driven by gears 40 and 41 mounted on the shaft 4, see Figs. 1 and 9. The gear 40 is keyed to the shaft by means of a key 42, see Figs. 9 and 10, and the gear 41 is keyed to the shaft by the nut 13, see Figs. 9 and 11, said gear being confined between the feeding wheel 118 and the head 6. Both of these gears must, therefore, rotate with the shaft 4, but since the gear 41 is mounted on the nut 13, said gear will be moved longitudinally of the shaft with the nut, and may, therefore, be adjusted with the head 6. The rotation of the shaft 4, therefore, will positively rotate both cutters 35. The shaft 4 is rotated by means of the handle 43, which is pivoted on a stud 44 projecting from the frame 5, and has rigid with the hub thereon a gear 46 which meshes with an idler 47 also carried by the frame 5. The idler 47 in turn meshes with a gear 48 which is keyed to the shaft 4.

The cutters 35, 36, are shear cutters, that is, they overlap each other, as shown in Fig. 20, and operate to cut the goods with a shear cut. The cutters 35 each have associated therewith a roll 50 which is rigidly secured to the cutter and with which the shade material has contact as it is drawn past the cutters. Each cutter 36 is sustained on a stud 51 which is carried by the arm 37 secured to the corresponding head, and each cutter 36 also has rigid therewith a roll 50 which is situated over and coöperates with the roll 50 of the cutter 35. Both the rolls 50 are preferably provided with roughened surfaces so as to increase the frictional engagement between them and the shade material.

The gearing for driving each cutter 35 is so proportioned that the roll 50 for said cutter has a surface speed equal to the speed of movement of the shade material, and since the roll 50 for each cutter 36 has frictional engagement with the shade material, as shown in Fig. 20, it will follow that each cutter 36 will be rotated at the same speed as the corresponding cutter 35. These two rolls 50 serve therefore both to hold the edge of the shade material in proper position and to provide means for driving the top cutters 36. The rolls 50 for the top cutters 36 are beveled on one edge, as at 500, thus forming an annular groove in which the cutters 35 may be received, as plainly indicated in Fig. 20.

I have provided for varying the frictional engagement between the rolls 50 and the cloth and also for adjusting the roll of the upper cutters toward and from those of the lower cutters to accommodate different thicknesses of cloth. This is accomplished in this embodiment by making that portion of each stud 51 which carries a cutter 36 slightly eccentric, see Fig. 20, so that by turning the stud in the arm by means of a handle 55 extending from the stud, the cutter 36 may be carried toward and from the other cutter.

53 is an arm pivoted to the arm 49 and 
carrying at its end a pin 54 which bears against the end of the stud 51 and holds the latter in place. The cutter 36 is held on the stud 51 by a cotter pin or other equivalent means.

Associated with each pair of edge-trimmers 35 and 36 are creasers adapted to form creases in the edge of the trimmed material, on the line of which creases the material is to be folded. These creases each comprise creasing wheels 56 and 57, the wheels 57 being grooved and the wheels 56 being shaped to fit the grooves. Each wheel 57 is sustained on a stud 58 extending from the arm 49, see Fig. 4, and each stud has fast thereon a friction wheel 59 that is situated over the plate 68 and is adapted to rest on and be rotated by the cloth as the latter is drawn over said plate. Each creasing wheel 56 is mounted on an arm 60 which is pivoted to the head 5 at 61, and which is acted against by a spring 62 that yieldingly holds said creasing wheel 56 against the coöperating wheel 57. The spring 62 bears at one end against the head 5, and the other end against a screw 63 carried by the arm 60, by means of which screw the tension of the spring may be adjusted.

It is often desirable to make the creases which are formed by the wheels 57, 56 at different distances from the edge of the trimmed material, and to permit this to be done, I have in the present embodiment of my invention mounted the cutters 35, 36 so that they can be adjusted toward and from the creasing wheels. It will be noted that the creasing wheels are mounted on the heads 5 and 6, while the cutters 35, 36 are carried by the brackets 37. Each bracket 37 is adjustably sustained by its head, so that it with the cutters carried thereby can be moved toward and from the creasing wheels. While any suitable way of thus adjustably mounting the brackets may be employed, I have herein shown each bracket as sustained by pins 501 extending from the head and as having journaled therein an adjusting screw 502 which is screw-threaded into the head. By turning the screw, the brackets may be adjusted so that the material will be cut at the desired distance from the crease.

Associated with each creasing mechanism is a folding device adapted to fold the trimmed edge of the material on the line of the crease. Each folding device comprises a curved folding finger 64 which is sustained by an arm 65 extending from the head 5 or 6 as the case may be. One end 66 of each folding finger is situated so that the cloth will pass under said finger, and the other end 67 of said finger is bent down and carried under the curved folding plate 68 which is carried by the head, so that as the cloth is drawn over said plate the creased edge is folded thereunder. A similar folding device is used on each of the heads 5 and 6.

It will be noted that the folding plate 68 is curved, and this is a decided advantage, because the fold in the edge of the cloth is made while the cloth is resting against this curved folding plate. Because of this condition, the edge of the cloth can be folded over without causing any wrinkles or straining the cloth as could not be done if the folding were done while the cloth were straight.

When a sufficient length of material has been trimmed and folded, such length is cut off by a cutter which is adapted to move transversely of the material and longitudinally of the plate 27. This cutter is preferably in the form of a disk cutter 70 which is mounted on a carriage 71 adapted for movement longitudinally of the plate 27 and transversely of the material. Suitable means are also provided for rapidly rotating this cutter 70 during the traveling movement of the carriage. The carriage 71 is also preferably so constructed that during its movement transversely of the material it operates to crease the material adjacent to the cut end thereof so as to facilitate the folding of the hem at the bottom of the severed length of material. For this purpose, the plate 27 is provided with V-shaped tracks 72, 73, and the carriage 71 has the grooved wheels 74, 75, that travel on said tracks, see Figs. 1 and 4.

The shape of the tracks 72, 73 and the wheels 74, 75 is such that as the carriage moves over the shade material which overlies the tracks, the wheels and tracks form the requisite crease in the shade material.

The tracks 72, 73 and the plate 27 extend beyond the edge trimming cutters, as shown in Fig. 4, so that when the carriage 71 is at the right hand end of its travel, Fig. 4, it does not interfere with the drawing of the shade material from the table 31 over the plate 27 and down past the edge trimming and folding devices. When a sufficient length of shade material has been drawn from the table 31 then the carriage 71 is moved upon its tracks transversely of the shade material, and during such movement the length of shade material is cut off by the cutter 70 and the crease for the hem in the end of the shade material is formed by the wheels 74, 75.

While any suitable means for giving the carriage its movement may be employed, I have herein illustrated an endless cable arrangement which I find to be convenient because it can be operated readily from one side of the machine.

As illustrated, the carriage 71 has secured thereto one end of a flexible connection 76, which flexible connection passes around a direction pulley 77 at one end of the frame and then extends to and around a drum 78, see Fig. 15. Said carriage also has secured thereto another flexible connection 79 which extends around a direction pulley 80 at the other side of the frame and then extends to the drum 78, the connections 76 and 79 being wound about the drum 78 in opposite directions. The shaft of the drum 78 has a pinion 81 thereon which meshes with and is operated by a rack 82. This rack is connected at one end to a sliding actuator 83 which is mounted to slide on ways 84, and which has extending therefrom a handle 85 by means of which it may be manually operated.

When it is desired to move the carriage 71, the operator grasps the handle 85 and slides the actuator 83 on the guides 84, said actuator through the link 82 operating to turn the drum 78 and to wind up one of the flexible connections while permitting the other to unwind. The carriage is thus given its reciprocating movement.

The size of the pinion 81 is relatively small compared with the size of the drum 78, and therefore a comparatively small stroke of the actuator 83 is sufficient to give the carriage its full movement in either direction.

For rotating the cutter 70, I have provided a pinion 86 on the carriage 71, which pinion is adapted to mesh with rack teeth 87 on the bottom of the transverse bar 88 by which the pulleys 77 and 80 are supported as plainly seen in Figs. 6 and 15. This pinion 86 meshes with a pinion on the shaft 750 carrying the cutter 70 and thus the cutter is rotated as the carriage is moved. The edge of the cutter 70 is received in a groove 89 formed in the plate 30, and by its rapid rotation it operates to cut the goods during the movement of the carriage.

As stated above, the feeding rolls 32, 33 are positively driven and operate to feed the trimmed length of shade material into the pocket 34. For driving these feeding rollers, I have provided the roller 32 with a gear 90 which meshes with and is driven by a gear 91 fast on the shaft 4; and the roller 33 is also provided with a gear 92 which meshes with and is driven by the gear 90. The roller 33 is preferably yieldingly mounted and for this purpose is carried by two arms 94 pivoted to the frame and is acted on by two springs 95 which tend to yieldingly hold the roller 33 against the roller 32.

Situated adjacent the feed rollers 32 and 33 and in position to receive the shade material therefrom is an open throat 96 (see Figs. 18 and 19) leading to the pocket 34. This throat is formed by the stationary guide plate 97 and the coöperating movable guide plates 98. The movable guide plate is carried by arms 99 which are curved, as shown in Fig. 1, and are provided with the stems 100 which are pivoted to the frame at 101.

Extending between the two arms 99 are two shafts 102 on each of which is mounted a plurality of friction rolls 103, the rolls on the two shafts 102 preferably being staggered, as shown best in Fig. 4.

The two arms 99 support a rock shaft 104 which has rigidly extending therefrom arms 105 that carry a shaft 106 on which are rigidly mounted rolls 107. The rolls 103 and 107 form the periphery or bounding wall of the pocket 34, and all these rolls are positively driven. The function of these rolls is to receive the shade material from the throat 96, and by positively acting on it to roll the length of shade material as it comes into the pocket 34 up into a roll, as shown in Fig. 18. For positively driving these various feed rolls, I have shown the gear 90 as meshing with and driving an idler gear 108 which in turn meshes with and drives a gear 109 loose on a stud carried by the frame, and said gear 109 meshes with and drives a gear 290 which is loose on one of the shafts 102. This gear 290 has a pawl-and-ratchet connection with a pulley 110 which is fast to the said shaft 102, and said pulley is belted to a pulley 111 on the lower shaft 102 and is also belted to an idler 211 on the rock shaft 104, said idler being in turn belted to a pulley 212 on the shaft 106, as plainly seen in Figs. 2 and 8. With this arrangement the feed rolls on the shafts 102 and 106 are driven in the proper direction for rolling up the shade material in the pocket as the latter is fed thereinto. As the shade material is fed over the feeding wheels 118, it is deflected by the deflecting block 220 into position to be fed between the feed rolls 32, 33, as seen plainly in Fig. 18, and from the latter it is fed into the throat 96, the plates 97 and 98 being flared at the opening of the throat to direct the edge of the shade material thereinto.

After the length of shade material has been severed and has been fed into and rolled up into the pocket 34, I have provided for opening said pocket to permit the severed and trimmed length to be discharged therefrom.

As stated above the stems 100 of the arms 99 are pivoted to the frame at 101, and connected to the extended ends of one of the stems is a link 310 provided with a hooked end 311.

The shaft 104 has rigid therewith an arm 112 which carries a pin 229 playing in a slot in the end of a link 113 which in turn is pivoted to a plate 114 that is adjustably secured to a bracket 115, which is sustained by the frame of the machine. The handle 143 by which the shaft 4 is operated carries a block 232 which is beveled on one side, as at 233, see Fig. 2, and provided with an aperture 231, said block having a shank 230 which is sustained by ears 234 projecting from the handle 43 and which is surrounded by a spring 235 which tends to keep the block maintained in the position shown in Fig. 2. The aperture 231 in said block is adapted to receive the hooked end 311 of the link 310 and when said hooked end is occupying the aperture, the turning of the handle 43 backwardly will operate to draw the link 310 to the left and thus swing the arms 99 into the position shown in Fig. 19. While the arm is swinging into this position, the pin 229 carried by the arm 112 is brought down against the end of the slot in the link 113 and during continued swinging movement of the arms 99, the link 113 and arm 112 serve to raise the arm 105 slightly. The result of this operation is that the pocket becomes fully opened, as shown in Fig. 19, the plate 98 being withdrawn entirely from beneath the plate 97, and the roll of material which has been rolled up in the pocket is permitted to drop out.

The block 232 is swiveled in the ears 234 to permit it to turn in the ears as the handle 43 is turned backwardly.

While the handle 43 is being turned forwardly for drawing the shade material past the cutters and folders, the link 310 is disengaged from the block 232 and therefore the pocket 34 remains in its closed condition. Whenever the length of shade material has been trimmed and cut and has been rolled up in the pocket, then the hooked end 311 of the link 310 is placed in the aperture 231 and the handle 43 moved backwardly thereby to open the pocket as above stated and permit the rolled-up material to be dropped therefrom.

After a length of shade material has been severed from the untrimmed material on the table 31 and said length has been fed into and rolled up in the pocket 34, as above described, it is necessary to draw the uncut and untrimmed material from the table 31 over the supports 24 and into position to be gripped by the feed rolls 32, 33. To accomplish this, I have provided a plurality of grippers which are arranged to be moved into position to grip the edge of the uncut shade material and draw the latter over the supports 24 and deliver such material to the feed rollers 32, 33. These grippers are mounted on the feeding wheels 118 which are carried by the shaft 4, see Figs. 5, 16 and 17, one of said wheels being keyed to the shaft by the key 42 and the other being keyed to the shaft by the nut 14. Each of the wheels has a pair of gripping jaws 119 and 120, see Figs. 5, 16 and 17. Each gripping jaw 120 is carried by an arm 121 which is loosely mounted on a stud 122 carried by the wheel 118, each arm 121 having a tail 123 provided with a laterally-extending pin 124. Each jaw 119 is carried by an arm 125 which is rigid with the shaft 122, and each shaft has extending therefrom an arm 126 which is acted on by a suitable spring 127.

A spring 128 is used for normally holding the jaws closed together. Each head 5 and 6 carries a pivotally-mounted pawl 129 in position to be engaged by the pin 124. The pawls 129 are so placed that when the shaft 4 and feeding wheels rotate backwardly, see Fig. 1, or clockwise, see Fig. 5, the pins 124 come into engagement with the pawls at the time when the wheels are carried into position to engage the edge of the shade material on the plate 30, as shown in Fig. 16, and when said pins strike the pawls, the jaws are opened so that the edge of the shade material enters between the gripping jaws during the movement of the latter, it being noted that the member 30 is concaved on its upper face so that the inclined surface 345 directs the edge of the material $m$ upwardly, as shown in Fig. 16, into position to be readily grasped by the jaws. When the pins 124 pass off from the pawls 129, the grippers are closed together on the shade material by the springs 127, 128. When the edge of the uncut material on the table 31 has been thus gripped by the grippers 119 and 120, the shaft 4 is rotated in the opposite direction or clockwise, Figs. 1 and 16, and the grippers serve to draw the material across the plate 27, past the edge trimming and folding devices and down into position to be fed between the rolls 32 and 33.

As the feeding wheels begin their feeding movement, the pins 124 pass above the pawls 129, and since the latter are pivoted they yield to the movement of the pins and do not cause the gripper jaws to be opened.

To cause the gripper jaws to release the material at the proper time, the heads 5 and 6 are each provided with cams 130, see Fig. 5, which are in position to engage the pins 124 and open the gripper jaws when the latter are substantially opposite the feed roll 32. After the edge of the material m passes between the feed roll 32 and the feeding wheels 118 and has been released by the grippers, further feeding movement of the material is accomplished by the combined action of said feed roll and feeding wheels, and the deflecting block 220, see Fig. 18, operates to deflect the edge of the material between the feed rolls 32 and 33.

Since the feeding wheels 118 carrying the grippers are mounted to rotate with the shaft 4 it is necessary to turn the shaft 4 backwardly to bring the grippers into position to grip the edge of the material on the table 31, and as soon as the grippers have engaged the material the shaft is turned forwardly again by the handle 43, thus drawing the shade material over the support 24.

It is during the backward turning movement of the handle 43 necessary to give the grippers their backward movement that the link 310 is operated on to open the pocket 34, as above described.

I have also provided a gage by which predetermined lengths of shade material may be drawn from the table 31 at each operation of the machine. The gage may be adjusted so that any desired length may be drawn from the table at each operation, and said gage is so arranged that the shaft 4 and consequently the feeding means will be positively arrested when the desired length has been so drawn from the table.

As herein illustrated the head 5 has rigid therewith a gage ring 140 provided with a plurality of apertures 141. Loosely mounted on a stud 142 carried by the head 5 (see Fig. 14) is a gage arm 143 carrying at its end a pin 144 which can be entered into any one of the apertures 141 depending on the position of the arm 143.

The arm 143 carries a stop device 145 which is mounted on an arm 146 pivoted to the arm 143. Loosely mounted on the stud 142 is a gear 147 which meshes with and is driven by a gear 148 loosely mounted on the shaft 4, see Fig. 9.

The gear 148 is normally locked to the gear 48 by means of the spring-pressed pin 149 which is slidably mounted in the gear 48 and projects through the latter into a notch in the gear 148. Said pin 149 has projecting therefrom an arm 150 which works in a slot 151 in the hub of the gear 48, as seen in Figs. 9 and 13.

The gear 147 is provided with the large or stop tooth 152 which is adapted to engage the stop 145 as the gear 147 is rotated. The gage ring 140 is graduated, as shown in Fig. 1, and the arm 143 is provided with a pointer 155. When the parts are in the normal position the large tooth 152 of the gear 147 rests against the hub of the gear 148. As the shaft 4 is turned to draw the shade material from the table 31, the gear 147 is turned in the direction of the arrow, Fig. 1, and this operation may continue until the stop tooth 152 engages the stop 145 when further movement of the shaft 4 will be arrested. The distance that the gear 147 can be thus turned before it is arrested, depends on the position of the gage arm 143 and this may be set so that any desired length of material will be drawn from the table at each operation.

In the operation of the machine, it is necessary after a length has been severed by the cutter 70 to feed said length completely into the pocket 34 before bringing the grippers into position to feed a fresh length onto the supports 24, and, therefore, I provide for releasing the stop 145 from the stop tooth 152 by the movement of the carriage 71 as the cutter 70 operates. For this purpose the stop 145 has pivoted thereto a pawl 160 which is acted on by a suitable spring 161, see Fig. 3, and which pawl is normally held against the stop 162 by said spring.

The pawl 160 in its normal position overlaps slightly the shoulder 163 of the stop 145 so that when the stop tooth 152 is brought into engagement with the shoulder the pawl 160 is swung to the left slightly.

The arm 146 has connected to one end thereof a flexible connection 165 which extends through an eye 166 carried by the arm 143 in line with the stud 142 and which extends thence to a lever 167, see Fig. 14, pivoted to the plate 30. The lever has pivotally connected thereto a pin 168 which extends through an aperture in the plate 27 and which is in position to be engaged by the rolls 169 mounted on the carriage 71. As said carriage is moved over the track for cutting a length of shade material and creasing the edge of the latter, the roll 169 depresses the pin 168 thereby drawing on the connection 165 and raising the stop 145 out of engagement with the stop tooth 152. As soon as the stop is thus raised out of engagement with the tooth the spring 161 returns the pawl 160 to normal position so that when the roll is passed off from the pin 168 and the arm 146 returns to its normal position, the stop is held out of engagement with the stop tooth, as shown in Fig. 3, and the gear 147 is free to be further rotated. After the carriage has been moved across the machine thereby to cut a length of shade material and the stop 145 has thus been released from the stop tooth 152, the operator may continue the rotation of the handle 43 and the shaft 4 until the severed length of shade material is completely fed into the pocket 34. The carriage 71 is arranged so that it may be moved across the table in one direction to sever the first length and then brought back across the table in a reverse direction to sever the next length, etc.

I have also provided for returning the gear 147 to its initial position at the time that the shaft 4 is reversed to bring the grippers into position to engage the length of material on the table 31. To accomplish this, the gear 147 has connected thereto one end of a spring 170, the other end of which is fast to the head 5, said spring being arranged so that as the gear is rotated in the direction of the arrow, Fig. 1, the spring is wound up. The head 5 also carries a pivoted cam 171, see Fig. 13, which is adapted to engage the arm 150 when the shaft 4 and the gear 48 are rotated backwardly thereby to withdraw the pin 149 from the gear 148. The cam 171 is so arranged that when the shaft 4 is turned forwardly the arm 150 will pass in behind said cam and force the latter outwardly against the action of the spring 175. When, however, the shaft is turned backwardly the point of the cam enters between the arm 150 and the gear 48 thereby withdrawing the pin 149. As soon as the pin 149 is thus withdrawn sufficiently to unlock the gear 148 from the gear 48, the spring 170 will automatically return the gear 147 to its initial position.

The operation of the device will be readily understood from the above description, but may be briefly summarized as follows: The gage arm 143 is first set according to the length into which it is desired to cut the shade material, and the uncut shade material is placed on the table 31. The edge of the shade material is then passed under the spring-pressed roll 190 and brought into such position on the upper face of the member 30 that the edge of the material projects slightly beyond the surface 345 and into position to be gripped by the jaws 119 and 120, as shown in Fig. 16. The handle 43 is then turned backwardly thereby causing the grippers to be carried into position to grip the edge of the material, said grippers being automatically opened at the proper time by the pivoted cams 129. When the grippers have engaged the edge of the material the handle 43 is turned forwardly again thereby feeding said material over the plate 27 and past the edge-trimming and edge-folding mechanism. The grippers automatically release the material at the proper time, and said material is deflected between the feed rollers 32 and 33 by the deflecting block 220, and is fed into the pocket 34 where it is rolled up. The rotation of the shaft 4 also operates to positively drive the edge-trimming cutters 35, 36, as above described, and as the material passes through said cutters it passes between the creasers 56, 57, which crease it on the line where it is to be folded for making the side hem. From the creasers the material passes under the folding finger 67 which folds the creased edge around the plate 68, as above described. When the proper amount of shade material has been thus drawn from the table 31, further rotation of the shaft 4 is stopped by engagement of the stop tooth 152 with the stop 145 and the operator then manipulates the actuator 83 thereby to cause the carriage 71 to traverse the tracks 72, 73 and thereby sever the lengths of shade material and at the same time crease the latter.

The movement of the carriage operates to release the stop 145, as above described, so that the handle 43 and shaft 4 may be rotated further thereby to draw the severed length of material completely into the pocket. The handle 43 is then turned backwardly to cause the grippers to engage the edge of the material still remaining on the table 31 thereby to draw a fresh length through the edge-trimming devices, edge-creasing and edge-folding devices and into the pocket 34, and during such backward movement of the handle, the said pocket 34 is opened by the engagement of the spring-pressed block 232 with the hook 311 thereby to permit the rolled-up lengths of shade material within the pocket to be discharged therefrom and at the same time the gear 148 is disconnected from the gear 48 by the cam 171 and the gear 147 is returned to its initial position. These operations are then repeated.

It will be noted that there is one track 72 and a plurality of parallel tracks 73. The object in making a plurality of tracks 73 is for making the two creases at the bottom edge of the material different distances apart depending upon the width desired for the hem. The wheel 75 which operates on the track 73 is slidably mounted on its journal 750 so that it may be set to travel over any one of the tracks 73 as desired.

The drawings show one embodiment of the invention only which has been selected as illustrative of the invention, and I wish to state that the invention is not confined to the constructional details herein shown.

Having fully described my invention, what I claim as new and desire to secure by Letters Patent is:—

1. In a machine of the class described, the combination with an edge trimmer, of a reciprocating gripper device to take untrimmed shade material from beyond said trimmer and feed it past the trimmer, feed rolls to take the material from the gripper and continue the feeding movement thereof, and means to roll up the trimmed material.

2. In a machine of the class described, the combination with a feeding wheel, of an edge trimmer to act on and trim the edge of material while it is passing over the feeding wheel, feeding rolls situated on the delivery side of the edge trimmer, a gripper device carried by the feeding wheel and adapted to take untrimmed material from beyond the trimmer and feed it past the latter to the feeding rolls.

3. In a machine of the class described, the combination with an edge trimmer for trimming the edge of material in web or sheet form, of feeding rolls situated on the delivery side of said trimmer for feeding the material to said trimmer, a gripper device to take untrimmed material and deliver it to the feed rolls, and means to roll up the trimmed material.

4. In a machine of the class described, the combination with an edge trimmer for trimming the edge of material in sheet or web form, of feeding rolls situated on the delivery side of the trimmer for feeding untrimmed material thereto, means to rotate said rolls, gripper devices to take untrimmed material from beyond the trimmer and feed it past said trimmer and deliver it to the feeding rolls, means to stop the operation of the feeding rolls when a predetermined amount of material has been fed.

5. In a machine of the class described, the combination with an edge trimmer, of a creaser, a feeding roll to feed material to said trimmer and creaser, and gripper devices to take untrimmed material and feed it past said trimmer and creaser to the feeding roll.

6. In a machine of the class described, the combination with an edge trimmer, of a creaser, a feeding roll situated on the delivery side of the creaser to feed untrimmed material to the trimmer and creaser, a gripper device to take untrimmed material and feed it past said trimmer and creaser to the feeding roll, and means to roll up the trimmed and creased material.

7. In a machine of the class described, the combination with an edge trimmer, of a shaft, a feeding wheel mounted thereon, a feeding roll coöperating with said feeding wheel, said roll being situated on the delivery side of the trimmer, and a gripper device carried by said feeding wheel for taking untrimmed material and feeding it past the trimmer to the feeding roll.

8. In a machine of the class described, the combination with an edge trimmer, of a shaft, a feeding wheel mounted thereon, a feeding roll coöperating with said wheel and situated on the delivery side of the trimmer, a gripper device carried by said feeding wheel, means to cause said gripper to grip automatically the edge of untrimmed material on the feeding side of the trimmer, and means to cause said trimmer to release the material automatically as the material is delivered to the feeding roll.

9. In a machine of the class described, the combination with an edge trimmer, of a feeding wheel, grippers carried thereby, means to turn the feeding wheel first in one direction thereby to cause the grippers to engage the edge of untrimmed material, and then in the other direction to feed said material to the trimmer.

10. In a machine of the class described, the combination with an edge trimmer, of a feeding roll on the delivery side thereof to feed the material thereto, a feeding wheel, a gripper carried thereby, and means to turn the feeding wheel first in one direction to carry the gripper into position to engage untrimmed material and then in the other direction to feed said material past the trimmer to the feeding roll.

11. In a machine of the class described, the combination with an edge trimmer, of a feeding roll on the delivery side thereof to feed the material thereto, a shaft, a gripper carried thereby, means to turn the shaft first in one direction to carry the gripper into position to engage untrimmed material and then in the other direction to feed said material past the trimmer to the feeding roll, and means to roll up the trimmed material as it is delivered from the feeding roll.

12. In a machine of the class described, the combination with an edge trimmer, of a feeding wheel, a pair of grippers carried thereby, means to turn the feeding wheel to carry said grippers into position to grip the edge of untrimmed material and then to move said grippers in a direction to feed said material to the trimmer, and means to open said grippers automatically when in position to grip the material.

13. In a machine of the class described, the combination with an edge trimmer, of a feeding roll for feeding untrimmed material thereto, a feeding wheel coöperating with said feeding roll, a pair of grippers carried by the feeding wheel, means to move said feeding wheel to carry the grippers into position to engage untrimmed material and then in a direction to feed said material to the feeding roll, means to cause the grippers to automatically grip the edge of the untrimmed material, and means to automatically release said gripper from the material when the material has been delivered to the feeding roll.

14. In a machine of the class described, the combination with two edge trimmers, of two feeding wheels, a feeding roll coöperating with both feeding wheels, and a gripper device carried by each feeding wheel for delivering the material to said feeding roll.

15. In a machine of the class described, the combination with two edge trimmers, of two feeding wheels, a feeding roll coöperating with both feeding wheels, and a gripper device carried by each feeding wheel for delivering the material to said feeding roll, one of said feeding wheels being adjustable toward and from the other.

16. In a machine of the class described, the combination with two edge trimmers, of two feeding wheels, a feeding roll coöperating with both feeding wheels, and a gripper device carried by each feeding wheel for delivering the material to said feeding roll, one of said feeding wheels and the corresponding trimmer being adjustable toward and from the other feeding wheel and trimmer.

17. In a machine of the class described, the combination with a stationary head and an adjustable head, of an edge trimmer carried by each head, a feeding wheel associated with each head, and a gripper carried by each feeding wheel.

18. In a machine of the class described, the combination with a stationary head and an adjustable head, of an edge trimmer carried by each head, a feeding wheel associated with each head, a gripper carried by each feeding wheel, and a feeding roll coöperating with both feeding wheels.

19. In a machine of the class described, the combination with two heads, of a shaft journaled therein, two feeding wheels carried by said shaft, one associated with each head, a gripper device carried by each feeding wheel, an edge trimmer carried by each head, and means associated with the shaft to adjust one head and one feeding wheel longitudinally of the shaft.

20. In a machine of the class described, the combination with an edge trimmer, of a feeding roll 32, a shaft 4, two feeding wheels 118 carried by said shaft, a pair of grippers carried by each feeding wheel, and means to adjust one feeding wheel longitudinally of the shaft.

21. In a machine of the class described, the combination with an edge trimmer, of a creaser, means to feed sheet material to said trimmer and creaser, and means to adjust said trimmer and creaser toward and from each other to vary the distance of the crease from the trimmed edge.

22. In a machine of the class described, the combination with means to feed sheet material, of an edge trimmer to trim the edge of the material as it is fed, a pair of creasing wheels to act on the trimmed material and form a crease therein parallel to the edge.

23. In a machine of the class described, the combination with means to feed sheet material, of an edge trimmer to trim the edge of the material as it is fed, a pair of creasing wheels situated beyond the trimmer to act on the trimmed edge and make a crease therein, and means to adjust the trimmer toward and from the line of action of the creaser, whereby the crease may be formed at different distances from the trimmed edge.

24. In a machine of the class described, the combination with a head 5, of a creasing device carried thereby, a bracket 37 adjustably mounted thereon, and edge trimmers carried by the bracket.

25. In a machine of the class described, the combination with a feeding wheel over which material is fed, a feeding roll coöperating with the feeding wheel, an edge trimmer for trimming the edge of the material, said trimmer being situated to act on the material before the latter reaches the feeding roll, and a creaser situated between the trimmer and the feeding roll.

26. In a machine of the class described, the combination with a feeding wheel over which material is fed, of a feeding roll situated to act on the side of the feeding wheel, an edge trimmer situated above the feeding wheel to trim the edge of the material as it passes to the feeding wheel, and a creaser situated between the edge trimmer and the feeding roll.

27. In a machine of the class described, the combination with feeding devices, of edge-trimming devices, a receiving pocket, and means to roll up the trimmed material in said pocket.

28. In a machine of the class described, the combination with feeding devices, of edge-trimming devices, a receiving pocket, and positively-driven rolls acting on the material in the pocket to roll the same up therein.

29. In a machine of the class described, the combination with feeding devices, of edge-trimming devices, a receiving pocket, and positively-driven rolls at the sides of said pocket.

30. In a machine of the class described, the combination with feeding means, of edge-trimming means, a receiving pocket to receive trimmed material in said pocket, means to open the pocket to permit the rolled-up material to be discharged therefrom.

31. In a machine of the class described, the combination with feeding means, of a receiving pocket in which the material fed is received and rolled up, said pocket comprising two pivotally-mounted curved arms, shafts sustained by said arm and positively-driven feeding rolls mounted on said shafts, and means to swing the arms into position to permit the rolled-up material supported thereby to be discharged therefrom.

32. In a machine of the class described, the combination with feeding means, of two pivotally-mounted arms, a throat-plate sustained by said arms, a fixed throat-plate co-acting with the first-named throat-plate to form a throat through which material is fed, and positively-driven rolls sustained by said arms.

33. In a machine of the class described, the combination with feeding means, of a receiving pocket comprising two pivotally-mounted curved arms, a throat-plate supported thereby, positively-driven feeding rolls also supported thereby and forming the walls of the receiving pocket, a fixed throat-plate coöperating with the first-named throat-plate to form a throat leading through said pocket, and means to swing the pivoted arms into position to open the pocket and permit the material therein to be discharged.

34. In a machine of the class described, the combination with feeding means, of a pocket for receiving the material fed, said pocket comprising two pivotally-mounted curved arms, another arm pivoted to each of said arms, positively-driven rolls sustained by said arms and forming the sides of the pocket, and means to swing said arms away from each other thereby to open the pocket to permit the rolled-up material therein to be discharged.

35. In a machine of the class described, the combination with an edge trimmer, of a feeding roll situated on the delivery side thereof to feed material thereto, a receiving pocket to receive the material from the feeding roll, a gripper device, means to move said gripper device into position to engage untrimmed material and feed the latter past the trimming device to the feeding roll, and means to open the pocket during such movement of the gripping device.

36. In a machine of the class described, the combination with means to feed sheet material, of an edge trimmer for trimming the edge of the material, a track extending transversely of the direction of feeding movement of the shade material, a carriage mounted on said track, a cutter and creasing wheels both mounted on said carriage, and means to move the carriage on the track, thereby to cut the shade material and simultaneously crease it.

37. In a machine of the class described, the combination with means to feed shade material, of a carriage movable transversely to the direction of feeding movement of the shade material, means to move said carriage, and a cutter and a creaser both mounted on said carriage whereby the shade material is cut into lengths and creased simultaneously by movement of the carriage.

38. In a machine of the class described, the combination with means to feed shade material, of an edge trimmer, a V-shaped track extending transversely to the length of shade material and over which the latter passes to the trimmer, a carriage having creasing wheels running on said track, and means to operate the carriage whereby creases are made in the material transversely of the length thereof.

39. In a machine of the class described, the combination with means to feed shade material, of an edge trimmer, a plurality of V-shaped tracks extending transversely to the direction of feeding movement of the material, a carriage having creasing wheels running on said tracks, certain of said wheels being adjustable to run on different tracks, and means to move the carriage on said tracks.

40. In a machine of the class described, the combination with means to feed shade material, of an edge trimmer, a plurality of V-shaped tracks extending transversely to the line of feeding movement and situated on the feeding side of the edge trimmer, a carriage having creasing wheels running on said track, and means to move said carriage.

41. In a machine of the class described, the combination with means for feeding shade material, of a V-shaped track extending transversely to the direction of feeding movement of the shade material and over which said shade material passes during its feeding movement, a carriage having creasing wheels running on said track, and means to operate said carriage whereby creases are made in the material transversely to the length thereof.

42. In a machine of the class described, the combination with means for feeding shade material, of a carriage movable transversely to the direction of the feeding movement of said material, a rotary cutter mounted on said carriage, creasing wheels also mounted on said carriage, a stationary rack situated above the carriage, a gear on the carriage meshing with said rack and engaging the cutter, and means to operate said carriage thereby to cut the shade material and simultaneously to crease the same.

43. In a machine of the class described, the combination with means for feeding shade material, of a carriage movable transversely to the direction of feeding movement thereof, a cutter and creasing wheels both mounted on said carriage, a track coöperating with said creasing wheels to crease the material, flexible connections secured to the carriage and passing over idlers, a drum for winding up or unwinding said flexible connections, and means for turning said drum in either direction.

44. In a machine of the class described, the combination with means for feeding shade material, of a carriage movable transversely to the direction of feeding movement of said material, a cutter on said carriage, creasing wheels also mounted on said carriage, a track over which said creasing wheels run, flexible connections 76, 79, each connected at one end to the carriage, a drum 78 about which the other ends of said flexible connections are oppositely wound, and means for turning said drum in either direction.

45. In a machine of the class described, the combination with means for feeding shade material, of a carriage movable transversely to the direction of feeding movement of said material, a cutter on said carriage, creasing wheels also mounted on said carriage, a track over which said creasing wheels run, flexible connections 76, 79, each connected at one end to the carriage, a drum about which the other ends of said flexible connections are oppositely wound, a pinion connected with the drum, and a rack for engaging the pinion thereby to turn the drum in either direction.

46. In a machine of the class described, the combination with means for feeding shade material, of a track extending transversely to the direction of feeding movement thereof, a carriage on said track, a rotary cutter mounted on the carriage, a rack bar situated above the track, means engaging the rack bar for rotating the cutter as the carriage moves, idlers carried by the ends of said rack bar, flexible connections each having one end connected with the carriage and each passing over an idler, a drum about which the other ends of said flexible connections are oppositely wound, and means for operating the drum.

47. In a machine of the class described, the combination with means for feeding shade material, of a rotary stop gear connected with said feeding means to be rotated thereby, and an adjustable stop situated to be engaged by said gear and thereby prevent further rotary movement thereof and further operation of the feeding means.

48. In a machine of the class described, the combination with means for feeding shade material, of a rotary stop gear connected with and operated by said means, an adjustable stop to limit the extent of rotary movement of the stop gear and thereby limit the movement of the feeding means, and an index associated with said stop.

49. In a machine of the class described, the combination with means for feeding shade material, of a rotary stop gear connected with said means and rotated thereby, an index arm mounted to swing about the axis of said stop gear, means to position said arm at a point corresponding to the desired length of the shade material, and means carried by said arm and adapted to engage and limit the movement of the stop gear thereby limiting the movement of the feeding means.

50. In a machine of the class described, the combination with means for feeding shade material, of a rotary stop gear connected with said means and rotated thereby, an index arm mounted to swing about the axis of said stop gear, means to position said arm at a point corresponding to the desired length of the shade material, and a stop pawl carried by said arm and adapted to engage and limit the movement of the stop gear thereby limiting the movement of the feeding means.

51. In a machine of the class described, the combination with means for feeding shade material, of a rotary stop gear connected with said feeding means to be rotated thereby, an adjustable stop to engage said gear and limit the rotary movement thereof, thereby limiting the operation of the feeding means, means for cutting the shade material into lengths, and means to release said stop by the operation of the cutting means.

52. In a machine of the class described, the combination with means for feeding shade material, of a carriage mounted to move transversely of the direction of feeding movement thereof, a cutter on said carriage, a stop mechanism for the feeding means, and means to render the stop mechanism inoperative by movement of said carriage.

53. In a machine of the class described, the combination with means for feeding shade material, of a carriage movable transversely to the direction of feeding movement thereof, a cutter on said carriage, a stop gear connected with the feeding means, a stop pawl for engaging said gear thereby to limit the movement thereof, and means to release said pawl from said gear by the movement of the carriage.

54. In a machine of the class described, the combination with means for feeding shade material, of a carriage movable transversely to the direction of the feeding movement thereof, a cutter on said carriage, a stop gear connected with the feeding means, an index arm mounted to swing about the axis of the stop gear, a stop pawl pivotally carried on said arm and adapted to be engaged by the stop gear, and means to release the pawl from said gear by movement of the carriage.

55. In a machine of the class described, the combination with a curved folding plate, and means to feed sheet material over the convex face thereof of a folding finger having one end situated above said plate and the other end bent into a position beneath the plate, and means to feed said material over said folding plate whereby the edge of the material is folded by said finger.

56. In a machine of the class described, the combination with a folding plate having a convex surface, of means to feed sheet material over said convex surface, and a folding finger situated adjacent the end of the plate, one end of said finger being located above the plate whereby the edge of the material passes between said end of the finger and the plate and the other end of the finger being bent around the edge of the plate to occupy a position beneath the plate.

57. In a machine of the class described, the combination with a folding plate having a cylindrical surface, of means to draw sheet material peripherally over said surface, and a folding finger situated to engage the edge of the material and fold it back on the body of the material as the latter moves over said plate.

58. In a machine of the class described, the combination with a convexly-curved folding plate, of means to feed sheet material over the convex surface of said plate, and a folding finger having one end situated so that the edge of the material will pass between it and the plate, the other end of said finger being bent around the edge of the plate, and situated on the opposite side thereof whereby the edge of the material will be folded around the edge of the folding plate.

In testimony whereof, I have signed my name to this specification, in the presence of two subscribing witnesses.

CALVIN N. COLPITTS.

Witnesses:
 Louis C. Smith,
 Bertha F. Heuser.